United States Patent [19]
Kinsella

[11] Patent Number: 6,148,094
[45] Date of Patent: *Nov. 14, 2000

[54] POINTING DEVICE WITH BIOMETRIC SENSOR

[75] Inventor: David J. Kinsella, 13614 Highway 71 West, Austin, Tex. 78733

[73] Assignee: David J. Kinsella, Austin, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/940,553

[22] Filed: Sep. 30, 1997

Related U.S. Application Data

[60] Provisional application No. 60/027,254, Sep. 30, 1996.

[51] Int. Cl.[7] .................................................... G06K 9/00
[52] U.S. Cl. ............................................. 382/124; 345/167
[58] Field of Search .................................... 345/173, 167, 345/175, 163, 164; 382/124, 127, 116, 125; 340/825.34; 250/221; 248/118, 118.1, 118.3, 118.5; 902/3, 4, 5, 6; 713/186

[56] References Cited

U.S. PATENT DOCUMENTS

| | | | |
|---|---|---|---|
| 4,529,118 | 7/1985 | Granzow et al. . | |
| 5,010,238 | 4/1991 | Kadono et al. . | |
| 5,193,855 | 3/1993 | Shamos | 283/117 |
| 5,202,929 | 4/1993 | Lemelson | 382/2 |
| 5,229,764 | 7/1993 | Matchett et al. | 340/825.34 |
| 5,337,358 | 8/1994 | Axelrod et al. | 380/23 |
| 5,408,536 | 4/1995 | Lemelson | 382/2 |
| 5,457,747 | 10/1995 | Drexler et al. | 713/186 |
| 5,548,660 | 8/1996 | Lemelson | 382/116 |
| 5,703,356 | 12/1997 | Bidiville et al. | 250/221 |
| 5,802,199 | 9/1998 | Pare, Jr. et al. | 382/115 |
| 5,838,306 | 11/1998 | O'connor | 345/163 |
| 6,028,950 | 2/2000 | Merjanian | 382/126 |

OTHER PUBLICATIONS

"Start–Up Suni Bets On Integrated Process", Andrew MacLellan, *Electronic News*, Jan. 20, 1997, p. 18.
"Microsoft To Give Mouse A New Spin", *PC Week*, Jul. 22, 1996 (1 page).

(List continued on next page.)

*Primary Examiner*—Amelia Au
*Assistant Examiner*—Vikkram Bali
*Attorney, Agent, or Firm*—Fulbright & Jaworski

[57] ABSTRACT

A pointing device incorporates a biometric sensor at a location such that when operating the pointing device in a normal manner, a user's hand rests naturally in a position to place a finger of the user's hand in proximity to and readable by the biometric sensor. In one embodiment, a computer trackball pointing device includes a fingerprint sensor which is equally well suitable for use by either a right-handed or a left-handed user. Along with positional information from a position sensor and user selection information from at least one user-depressable button, the pointing device also conveys to an attached computer system information associated with the user's identity detected by the fingerprint sensor. Such a pointing device is well suited to both transparent verification as well as continuous verification, for if a user removes his or her hand from the natural position when using the device, the user's fingerprint will no longer be detectable by the fingerprint sensor, and the computer system to which the pointing device is attached can be alerted as to the need to re-authenticate any additional attempts at using the pointing device.

28 Claims, 10 Drawing Sheets

OTHER PUBLICATIONS

*FingerLoc* product description, "Live Fingerprint Capture Components", Harris Corporation web site (3 pages).

"A Direct Fingerprint Reader", McCalley, Setlak, Wilson and Schmitt (Harris Corporation Whitepaper), Mar. 26, 1996 (7 pages).

"Object Access via Fingerprint Recognition on Telephone Keys", IBM Technical Disclosure Bulletin, vol. 36, No. 09A, Sep. 1993, pp. 13–15.

"Vital Signs of Identity", Benjamin Miller, IEEE Spectrum, Feb. 1994, pp. 22–30.

"ID Sensing Presents A Touchy Situation—Harris Dilemma: Keeping Fingerprint IC Open Yet Protected", Terry Costlow, 1 page (source unknown).

Biomouse Product Description, "Biomouse Desktop Fingerprint Scanner", American Biometric Company Web Site (3 pages).

Security Print Product Description, "Security Print Biometric Products", Security Print Web Site (4 pages.

POINTING DEVICE WITH BIOMETRIC SENSOR

CROSS-REFERENCE TO RELATED APPLICATION

This application claims the benefit under 35 U.S.C. § 119(e) of U.S. Provisional Application Serial No. 60/027,254 filed Sep. 30, 1996, entitled "Controller Device" and naming David J. Kinsella as inventor, which provisional application discloses an exemplary embodiment of the present invention, and which provisional application is incorporated herein by reference in its entirety.

BACKGROUND OF THE INVENTION

1. Field of the Invention

This invention is related to pointing devices, and more particularly to such devices providing biometric feedback to an attached electronic system.

2. Description of Related Art

Modern society demands that people may be identified for many reasons. These include limiting access to bank accounts, limiting access to certain facilities such as a security area, a computer room, a police department, or a military facility, limiting which people are authorized to pick up a child from a day care center, limiting access to government welfare checks and health benefits, determining which prisoner to parole, and limiting access to adult activities such as electronic gambling. This has led to increasing use of identification cards, passwords, and PIN numbers to supplement, in those instances where automated identification is either necessary or desirable, those situations where human recognition is either unavailable or will not suffice. This obviously results in an increasing array and assortment of various cards, passwords, and PIN numbers that active participants in today's increasingly electronic society must carry with them (or ideally must memorize) to be able to access the functions and capabilities requiring such identification and verification.

Biometrics is the study of biological phenomena, and in the area of personal identification, some chosen characteristic of a person is used to identify or verify that person's identity. Biometric identification has gained interest in recent years because certain personal characteristics have been found to be substantially unique to each person and difficult to reproduce by an impostor. Further, the recording and analysis of biometric data is generally susceptible to automation owing to the increased use of computer controlled electronics and digital recording techniques. Biometric systems are automated methods of verifying or recognizing the identity of a living person on the basis of some physiological characteristic like a fingerprint or iris pattern, or some aspect of behavior like handwriting or keystroke patterns.

The biometric identifying characteristic may be biologically determined as with a fingerprint, or it may be some characteristic that is learned or acquired, such as handwriting or voice patterns. Ideally, the characteristic should be unique for every person and unvarying over the time frame during which the person may be tested for identification. The characteristic should also be difficult to duplicate by an impostor in order to secure against erroneous identification.

Some of the biometric characteristics most investigated today for use in a personal identification system include fingerprints, hand or palm prints, retina scans, signatures and voice patterns. Hand or palm print techniques typically evaluate the shape of a person's hand or other significant features such as creases in the palm, but these techniques may be fooled by templates or models of the hand of an authorized person. Retina scanning techniques evaluate the pattern of blood vessels in a person's retina. A drawback of this technique is that the blood vessel pattern may vary over time, e.g., when alcohol is in the blood stream or during irregular use of glasses or contact lenses. Also, a user may feel uneasy about having his or her eye illuminated for retina scanning or the possibility of eye contamination if there is contact between the eye and the scanning apparatus. Signatures can be forged easily and must usually be evaluated by a human operator, although work has been done on automated systems that evaluate the dynamics of a person's handwriting, such as the speed and the force of hand movement, pauses in writing, etc. Using voice patterns as the identifying characteristic encounters difficulties owing to the wide variations in a person's voice over time, the presence of background noise during an evaluation and the potential for an impostor to fool the system with a recording of the voice of an authorized person.

The most commonly used biometric characteristic and the one that has been the most investigated and developed is, of course, the fingerprint. Up until now, the technology of personal identification through fingerprint analysis has been used mainly in law enforcement, and this long term experience with fingerprint analysis has developed a large amount of information about fingerprints and has confirmed the uniqueness of a person's fingerprints. Historically, in law enforcement, fingerprints have been recorded by inking the fingerprint and making a print on a card for storage.

A fingerprint identification system is described in an article entitled "Vital Signs of Identity" by Benjamin Miller (IEEE Spectrum, Feb. 1994, pp. 22–30). The system for recognizing fingerprints requires the user to press a finger onto a glass or Plexiglas platen. Image sensors under the platen and a charge-coupled device (CCD) array capture the fingerprint image. A custom computer system and software analyses the digitized image and converts it to an approximately 1 K mathematical characterization which is compared against data stored in the local terminal or in networked versions of the system in a remote personal computer.

Rather than requiring a user to explicitly engage with verification devices, transparent verification attempts to identify the identity of a user not only unobtrusively, but during a transaction and using normal user interactions with the system. For example, a voice recognition system which also is able to identify a user by his voice pattern provides a capability of identifying a user as the user is speaking a request or command to the system, rather than as an explicit identification action or request by the user.

U.S. Pat. No. 5,229,764 to Matchett et al. describes a continuous biometric authentication matrix. This system activates and analyzes the biometric data from a plurality of biometrically-oriented personal identification devices at intermittent intervals and selectively allows or prevents continued use of a particular protected system or device by a particular individual. The system acts as a continuously functioning gate between a system to be protected and a prospective user. Many of the biometrically-oriented personal identification devices in the Matchett system attempt some degree of transparent verification and include thumbscan, digital photo, voice prints, fingerprints and others. One such device is a joystick device shown in FIG. 7 incorporating a thumbscan sensor on the top end of the joystick. In FIG. 8A a computer mouse is depicted carrying a hand geometry reader in a mouse casing. The hand geometry reader is wired through the mouse and its leads run back to the rest of the scanning unit along the same conduit PG as that of the mouse. FIG. 8B depicts a mouse having a thumbscan unit sensor incorporated into its side. The thumbscan sensor may be oriented relative to a mouse casing adapting it either for wright-handed persons or left-handed persons or both. A mouse lead is modified or replaced to carry both the mouse data and the sensor data.

A pointing device such as a computer mouse, joystick, or trackball, includes two principal components: a positional indicator allows movement by a user to be communicated as user positional information to an attached system (e.g., a computer system) to allow, for example, a pointer to be moved around a window or a screen of a graphical user interface; and input switches or buttons so that a user can provide selection information to the system which corresponds to a particular location to which the positional indicator has been moved. Both kinds of information are communicated through a typically small cable to the system to which the pointing device is attached. Alternatively, infrared beams and RF interfaces have also been used to allow for wireless pointing devices, particularly a wireless mouse.

Notwithstanding these devices, there is a need for additional and improved verification devices and capabilities for electronic systems, particularly those verification devices that provide for transparent continuous verification during normal user interactions with the system.

SUMMARY OF THE INVENTION

The present invention includes a pointing device which incorporates a biometric sensor at a location such that when operating the pointing device in a normal manner, a user's hand rests naturally in a position to place a finger of the user's hand in proximity to and readable by the biometric sensor. The location of the biometric sensor is equally well suitable for use by either a right-handed or a left-handed user, irrespective of hand size. Along with positional information from a position sensor and user selection information from at least one user-depressable button, the pointing device of the present invention also conveys to an attached system information associated with the user's identity detected by the biometric sensor. In one embodiment, the biometric sensor is a fingerprint sensor. Such a pointing device is well suited to both transparent verification as well as continuous, real-time verification, for if a user removes his or her hand from the natural position when using the device, the user's fingerprint will no longer be detectable by the fingerprint sensor, and the attached electronic system can be alerted as to the need to re-authenticate any additional attempts at using the pointing device. Minimal technical knowledge is required, for the identification functions are incorporated into a familiar pointing device. It affords a virtually foolproof, easily-used, and immediate method of identifying a user desiring access. A system audit log which records all attempted transactions, both authorized as well as non-authorized, may be easily implemented.

In one embodiment of the present invention, a pointing device includes an interface for operably communicating with an electronic system, a position sensor, responsive to user movement thereof, for conveying user positional information by way of said interface to the electronic system, a user-depressable button for conveying user selection information by way of said interface to the electronic system, and a biometric sensor disposed at a location such that when operating said pointing device in a normal manner a user's hand rests naturally in a position to place a finger of the user's hand in proximity to and readable by said biometric sensor, said location equally well suitable for use by either a right-handed or a left-handed user.

In another embodiment of the present invention, a pointing device includes an interface for operably communicating with a computer system, a base, a trackball mounted upon the base, an upper section connected to the base and including at least one button formed substantially on a top surface of the upper section, and a fingerprint sensor mounted within the upper section and disposed at a location such that when operating said pointing device in a normal manner, a user's hand rests naturally in a position to place a finger of the user's hand in proximity to and readable by said fingerprint sensor.

In yet another embodiment of the present invention, a pointing device includes an interface for operably communicating with a computer system, a base which is substantially circular in shape when viewed from above, thus having a generally circular perimeter, a trackball mounted off-center on the base at a location along the generally circular perimeter, an upper section connected to the base and including at least one button formed substantially on a top surface of the upper section, and a fingerprint sensor mounted within the upper section and disposed at a location such that when operating said pointing device in a normal manner a user's hand rests naturally in a position to place a finger of the user's hand in proximity to and readable by said fingerprint sensor.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Trackball Embodiments

Figure 1:
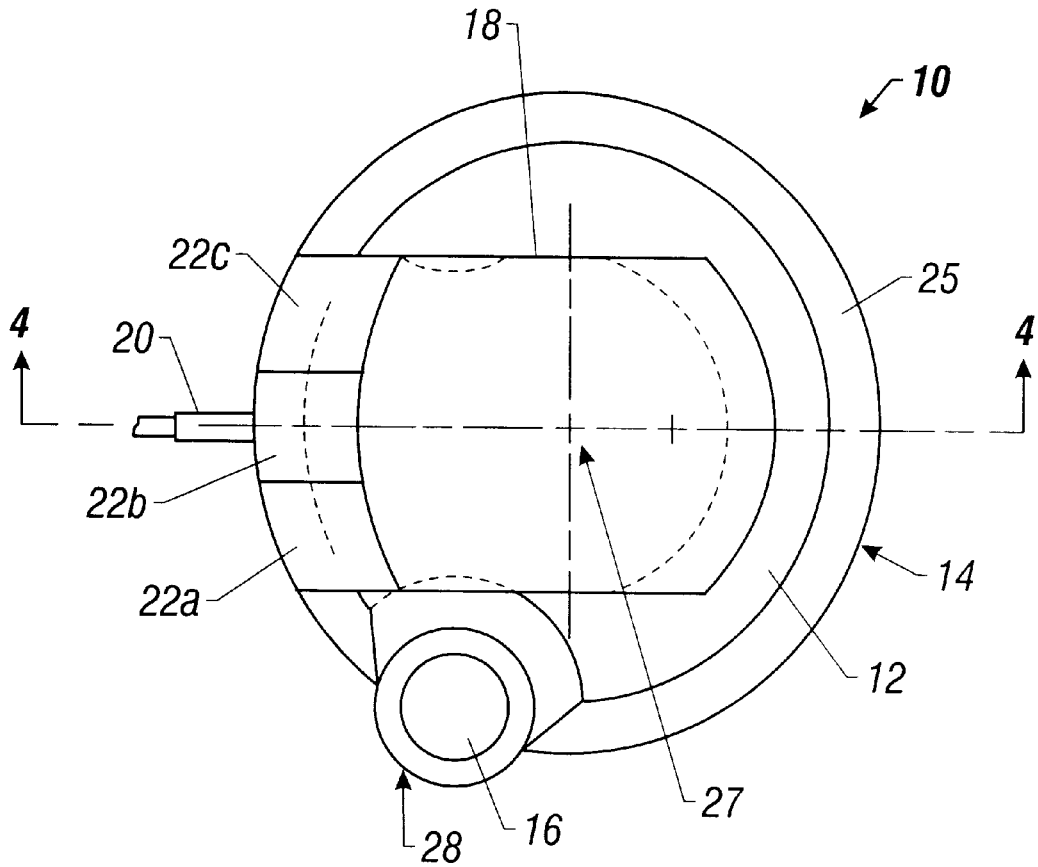
FIGS. 1, 2, and 3 are a top view, a side view, and a rear view, respectively, of one embodiment of a computer pointing device in accordance with the present invention.
Figure 2:
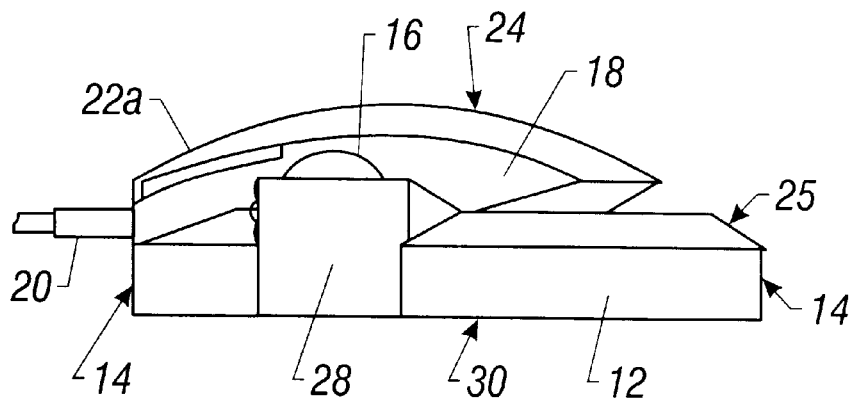
Figure 3:
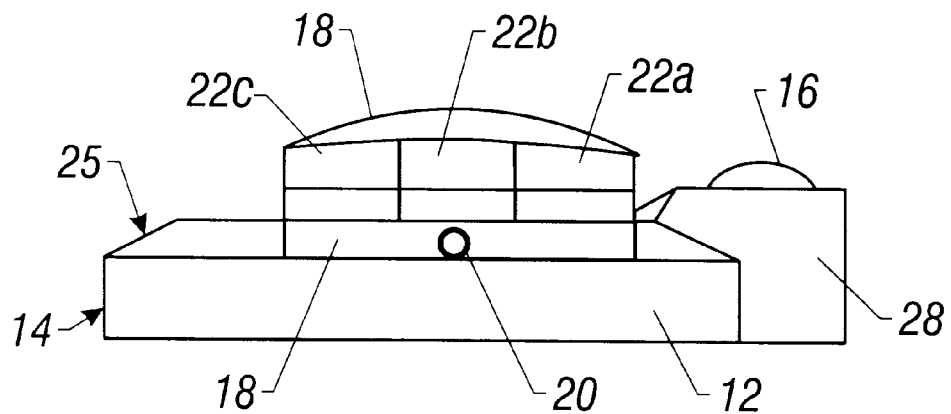

FIG. 1, FIG. 2, and FIG. 3 illustrate a top view, a side view, and a rear view, respectively, of a trackball embodiment of the present invention. Referring specifically to FIG. 1, a computer trackball pointing device 10 includes a base 12 which is substantially circular in shape and has a generally circular perimeter 14. It is preferably approximately 6 inches in diameter, weighs approximately 2 pounds, and is constructed generally of heavy duty plastic, although other dimensions are plausible. A chamfered surface 25 is formed between the top surface of base 12 and the perimeter surface 14. A trackball 16 is mounted off-center on the base 12 within a housing 28 formed on the base at a location intersecting the generally-circular perimeter surface 14. An upper section 18 is connected to the base 12 and includes, for this embodiment, three user-depressable buttons 22A, 22B and 22C formed substantially on a top surface 24 of the upper section 18. An interface 20 connects between the computer trackball pointing device 10 and an attached computer system, or other electronic system. A fingerprint sensor (not shown) or other suitable biometric sensor is mounted, for this embodiment, below the center button 22B within the upper section 18 which is a location such that when operating the trackball pointing device 10 in a normal manner, a user's hand rests naturally in a position to place the second finger of the user's hand (i.e., the "middle" finger) in proximity and readable by the fingerprint sensor located below user depressable button 22B. The arrangement is well suited for all users regardless of hand size. The trackball pointing device 10 is adaptable for both right-handed and left-handed users because the upper section 18 is rotatably connected to the base 12 so that the trackball is positionable to either a position leftward or a position rightward of the upper section. The axis of this rotation is indicated at location 27 and provides for a symmetrical positioning of trackball 16 on either the left side or the right side of upper section 18.

Referring now to FIG. 2, the bottom surface 30 of the base 12 is substantially flat and may include cushioning pads (not shown) such as low-profile self-adhesive rubber feet, or some other non-scratching surface treatment. The top surface 24 of the upper section 18 is shown, for this embodiment, as a substantially uniformly curved, convex surface which provides a comfortable surface for a user's palm and lower finger regions to rest comfortably upon the computer trackball pointing device 10. Referring specifically to the read view shown in FIG. 3, the interface 20 is shown as a cabled interface passing through the rear surface of the upper section 18. The flat bottom surface 30 of base 12, particularly when implemented with a reasonable large diameter, allows the computer trackball pointing device 10 to easily be placed on a user's lap, or on a soft surface such as a bed, rather than requiring a hard surface such as a desktop.

To rotate the position of the trackball 16 from one side to the other, the computer trackball pointing device 10 is elevated from the surface upon which it rests, the upper section 18 is maintained in a direction pointing away from the user (the interface 20 pointing away from the user) and the base 12 is rotated upon axis 27 sufficiently to cause the trackball 16 within housing 28 to be moved from, for example, the left side of the upper section 18 (as is indicated in FIG. 1) to the right side of upper section 18.

Figure 4:
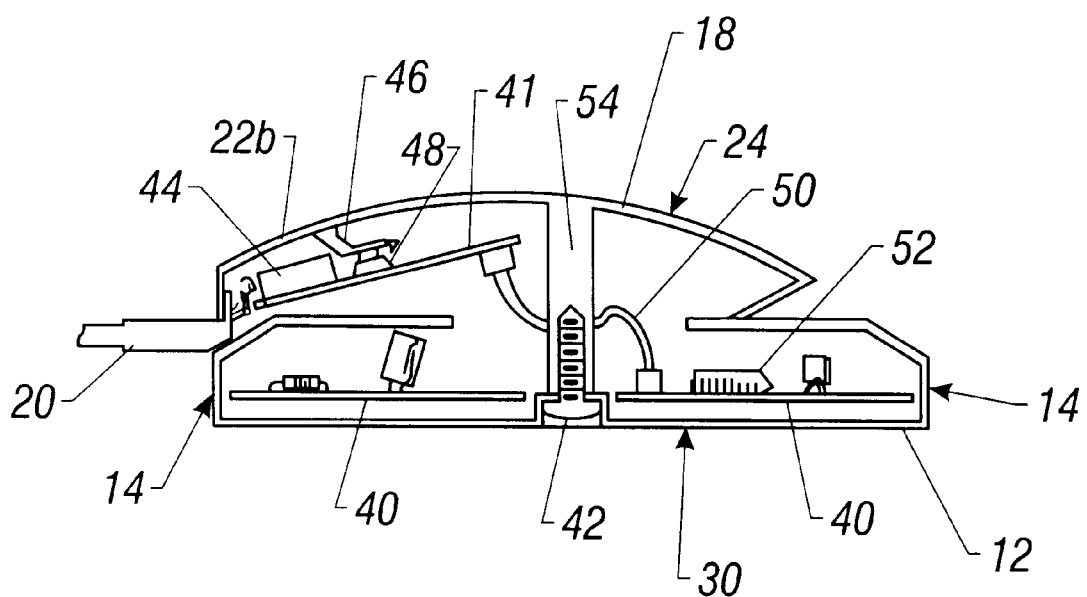
FIG. 4 is a cross-sectional view of the embodiment shown in FIG. 1.

Details of the rotating connection which provides this capability as well as other internal details of the trackball pointing device 10 are shown in cross-section in FIG. 4. Center column 54 is formed as part of the upper section 18 and provides the axis point for the base 12 to rotate with respect to the upper section. Screw 42 (and optionally a washer, not shown) fasten the upper section 18 to the base 12, as well as provide the axis of rotation for the base 12. Interface 20 is now more clearly illustrated as being connected to the upper section 18 so that when used by either right-handed or left-handed users, and when the three buttons are positioned away from the user (i.e., in a rearward direction), the interface is held and pointed in the same direction even as the base is rotated either leftward or rightward of the upper section. Lower circuit board 40 is shown providing a suitable carrier for necessary electronics to implement the functionality required of the computer trackball pointing device 10. For example, integrated circuit 52 is shown attached to a lower printed wiring board 40 (PWB), and an upper PWB-41 is shown electrically interconnected by interface cable 50 to the lower PWB-40. The upper PWB-41 includes a depressable switch 48 and a fingerprint sensor 44. In this embodiment, user depressable switch 22B is formed of a transparent material through which the fingerprint sensor (which may be an optical CCD sensor) may view the fingerprint of a user whose finger rests upon the surface of transparent button 22B. When depressed by a user, the button 22B causes switch 48 to be depressed by linkage 46. This allows the center button 22B to be an operable button, able to sense when a user depresses the button and to communicate such information to an attached electronic system. But the computer trackball pointing device 10 also provides, by way of the fingerprint sensor 44 viewing the fingerprint of the user through the transparent material forming button 22B, and at the same time, a scan of the user's fingerprint. This affords the capability of identifying or authorizing the particular user. When connected to an attached electronic system, this trackball pointing device 10 provides for the ability to read the fingerprint of a user, even as the user is using that very finger to make input selections to the attached electronic system.

It should also be appreciated when looking at the computer input trackball device depicted in FIGS. 1 through 4 that when the upper section 18 is rotated such that the trackball 16 is located leftward of the upper section 18, a right-handed user's hand when operating the device in a normal manner rests naturally in a position to place the second finger of the user's right hand in proximity and readable by the fingerprint sensor 44 and the user's right thumb in a position to comfortably move the trackball 16. Moreover when the upper section 18 is rotated such that trackball 16 is located rightward of the upper section 18, a left-handed user's hand when operating the device in a normal manner rests naturally in a position to place the second finger of the user's left hand in proximity to and readable by the fingerprint sensor 44 and the user's left thumb in a position to comfortably move the trackball 16.

Generally speaking, the fingerprint sensor 44 conveys information associated with the user's identity to the computer system attached by way of interface 20. This information may include a signal indicating whether the user is authorized to access the computer system. For example, a storage means such as an electronic memory may be included within the trackball pointing device 10 for storing information associated with the identity of at least one authorized user which is received from the attached computer system. Thereafter the fingerprint sensor 44 utilizing such storage, within the trackball pointing device 10, of authorized users may independently make a determination that a particular user attempting to use the device is an authorized user upon comparison of actual measured fingerprint with stored information from the authorized list. In other instances the information associated with the user's identity may include a signal indicating the attributes of the user's fingerprint so that the attached computer or other electronic system may determine whether the user is authorized to access the computer system. Examples of such attributes of the user's fingerprint include a digitized scanned image of the user's fingerprint, compressed representations of the user's fingerprint in digital or other form including a digital representation of the minutia of the user's fingerprint.

Other embodiments of similar input devices incorporating a biometric sensor may include a variety of different button positions in which the fingerprint sensor or other biometric sensor is located below a particular one of the button positions. FIG. 1 shows an pointing device 10 having three button positions, each of which is depicted to illustrate an operable button (e.g., buttons 22A, 22B, and 22C) at each of the button positions, but a particular button position may have either an inoperable button at such a location or no button whatsoever at the location. Moreover, the fingerprint sensor 44 or other biometric sensor may be located below a button position, whether operable or not, or at a location not beneath a button position. In another embodiment a three-button mouse includes a fingerprint sensor 44 disposed beneath an operable or inoperable center button position as is similarly depicted within the upper section 18 of the computer trackball pointing device 10 shown in FIG. 1.

While the base of the computer trackball pointing device 10 is shown in FIG. 1 as being rotatably connected to the upper section 18, other variations are equally plausible. For instance, a fixed connection could be easily implemented as a single-piece construction and could be configured for a right-handed or a left-handed user rather than as a single device which provides equal suitability to either a right-handed or a left-handed user. Likewise, similar moveable connections rather than a rotational connection are also contemplated which would allow a trackball device to be positioned in at least one of two locations such that suitable use for both right-handed and left-handed users may be achieved. The interface 20 which is depicted in FIG. 1 as being a wired interface may also be implemented as a wireless interface and could include an infrared, a radio frequency or any variety of other wireless techniques. The interface may instead include a wireless interface having a transducer located at a rear surface of the upper section 18. Fingerprint sensor 44 may be implemented as an optical imaging array as depicted in FIG. 4 in which the user's fingerprint is imaged through a transparent material forming button 22B. Such optical imaging arrays are commercially available, including from Suni Imaging Systems, Mountain View, Calif., and from Keytronics, Washington, D.C. Alternatively such a fingerprint sensor 44 may also be implemented as a capacitive imaging array, such as the FingerLoc™ series of sensors, available from the Harris Corporation, Melborne, Fla.

Figure 5:
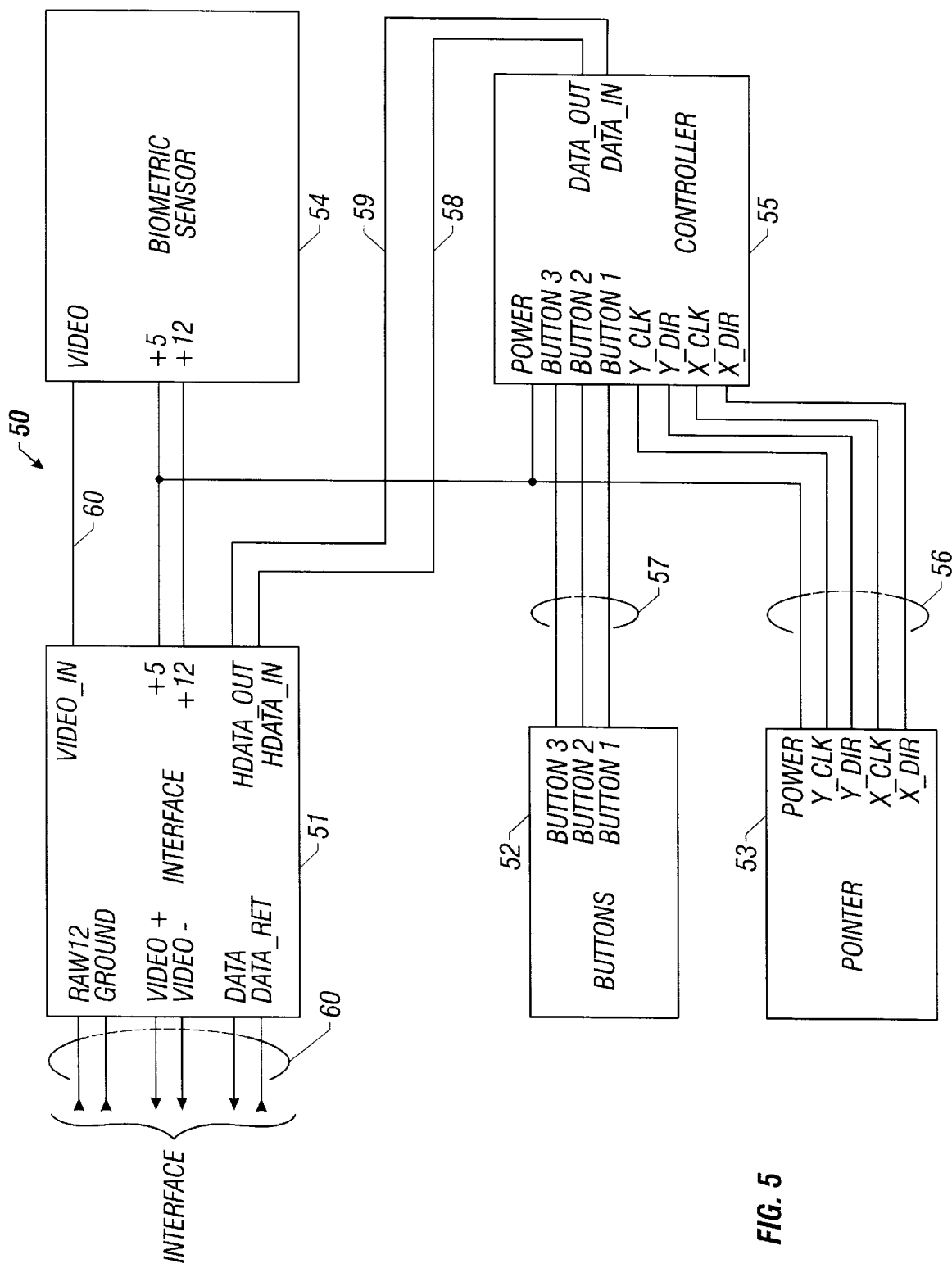
FIG. 5 is an electrical block diagram of an embodiment of electronic circuitry useful within the computer pointing device shown in FIG. 1.

FIG. 5 is an electrical block diagram of one embodiment of an electronic sub-system 50 which may be implemented within the computer trackball pointing device 10 shown in FIG. 1. The sub-system 50 includes an interface 51 which communicates to an attached computer system or other electronic system, a controller 55 for general control functions and for implementing traditional computer "mouse" functions, a button block 52 which includes traditional computer mouse user-depressable buttons, a pointer 53 which, in this case, includes circuits for implementing a computer trackball pointing device, and CCD camera 54 which provides a capability of visually scanning a user's fingerprint.

The interface 51 includes a group 60 of wires which provides communication to and from an attached system. These wires are preferably implemented using an unshielded twisted pair (UTP) cable having three twisted pairs of wires for connecting, using suitable connectors, to an attached computer or other electronic system. The group 60 of wires includes power terminal RAW12 and ground terminal GROUND for receiving power and ground from the attached system, differential video signal lines VIDEO+ and VIDEO− for conveying a differential video signal to the attached system, and serial data lines DATA and DATA_RET for respectively conveying serial data to and from the attached system. In other embodiments, a wireless interface, such as an infrared or RF interface, may also be used. On-board batteries may used to power the pointing device in lieu of power cables.

The button block 52 includes three user-depressable buttons (not shown) and conveys a signal for each button (BUTTON1, BUTTON2, and BUTTON3) in a group 57 of wires to the controller 55. Other numbers of buttons are also possible, including one, or two. The pointer 53 includes the trackball position sensor and communicates positional information using signals X_CLK, X_DIR, Y_CLK, and Y_DIR to the controller 55 via the group 56 of wires. The pointer 53 may also include a computer mouse position sensor. Power is also received from the interface 51 via a wire within the group 56 of wires.

The controller 55 receives power from the interface 51 via one of the wires 56, and also sends and receives serial data to/from the interface 51 via wires 59 and 58, respectively. Controller 55 provides for a point-and-click selection capability and data transfer capability to an attached system, to provide the traditional capabilities associated with a computer mouse or trackball.

Biometric sensor 54, such as a CCD camera, receives power from the interface 51 and conveys (for this example) a video signal to the interface 51 via wire 60. In other embodiments, other types of biometric sensors may be used, such as an capacitive fingerprint sensor rather than an optical sensor. One such sensor is the FingerLoc™ series of capacitive imaging array sensors, available from the Harris Corporation, Melborne, Fla. Additional control and data signals (not shown) between the interface 51, the controller 55, and the biometric sensor 54 are to be expected in other embodiments.

Figure 6:
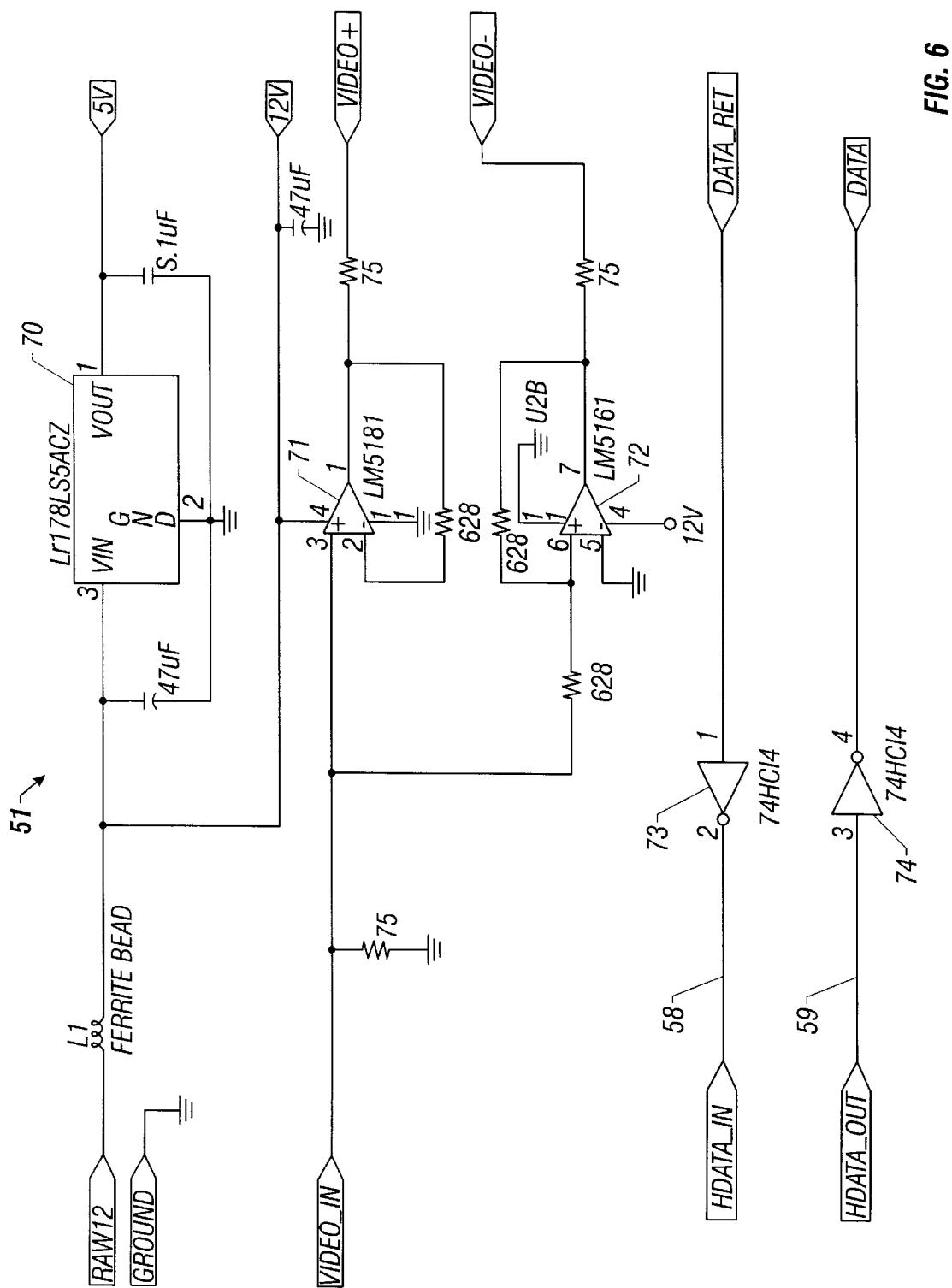
FIG. 6 is an electronic schematic drawing of interface circuitry depicted in FIG. 5.

Referring now to FIG. 6, one embodiment of the interface 51 includes a voltage regulator 70 for generating a +5 volt power supply from an incoming +12 volt supply, along with various related filtering capacitors and a ferrite bead. Twin video amplifiers 71, 72 produce a differential video signal from a single-ended signal received from the biometric sensor 54. Video amplifier 71 is configured as a unity gain amplifier with a 75 ohm output impedance, and video amplifier 72 is configured as a negative unity gain amplifier, also with a 75 ohm output impedance. Serial data buffers 73, 74 provide simple buffering to an already serial signal received from the controller 55 (e.g., HDATA_OUT) or received from the attached system (e.g., HDATA_IN).

Figure 7:
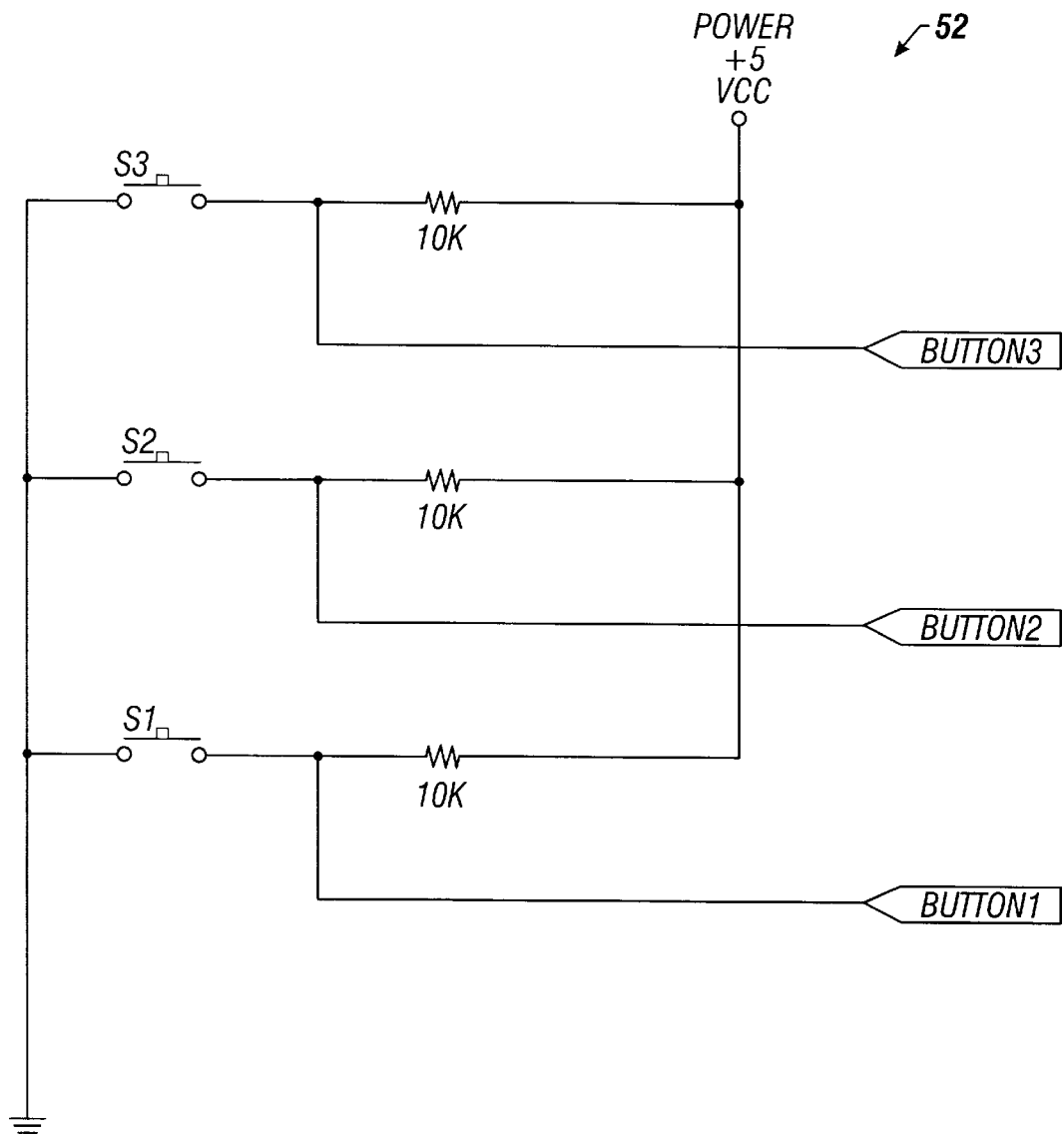
FIG. 7 is an electronic schematic drawing of user-button circuitry depicted in FIG. 5.

FIG. 7 depicts one embodiment of the button block 52. A respective pull-up resistor to a +5 power supply voltage is momentarily connected to ground by a respective user-depressable switch, and which generates the respective button signal.

Figures 8, 8A:
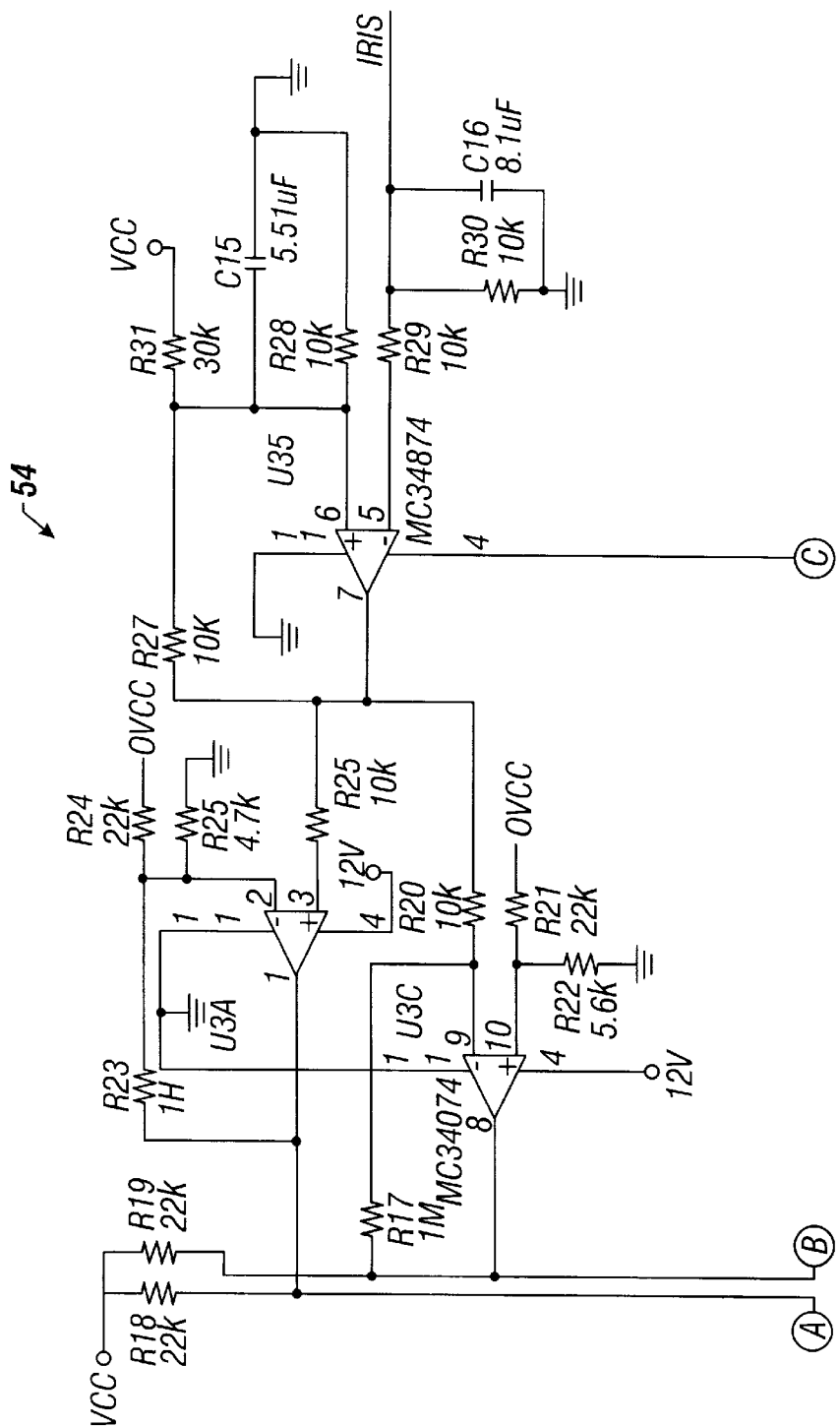
FIGS. 8A, 8B, 8C and 8D are an electronic schematic drawing of video circuitry depicted in FIG. 5.
Figure 8B:
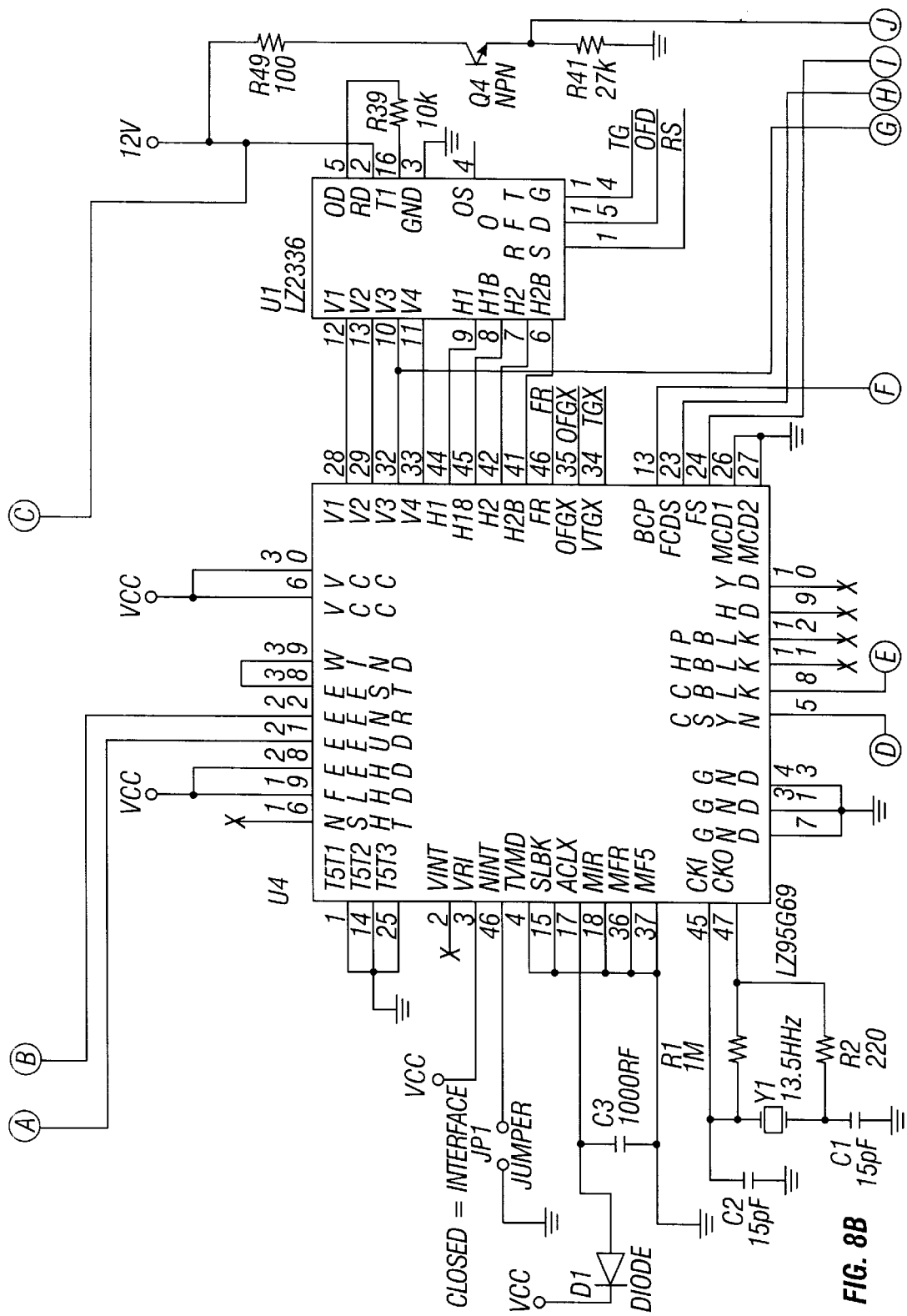
Figure 8C:
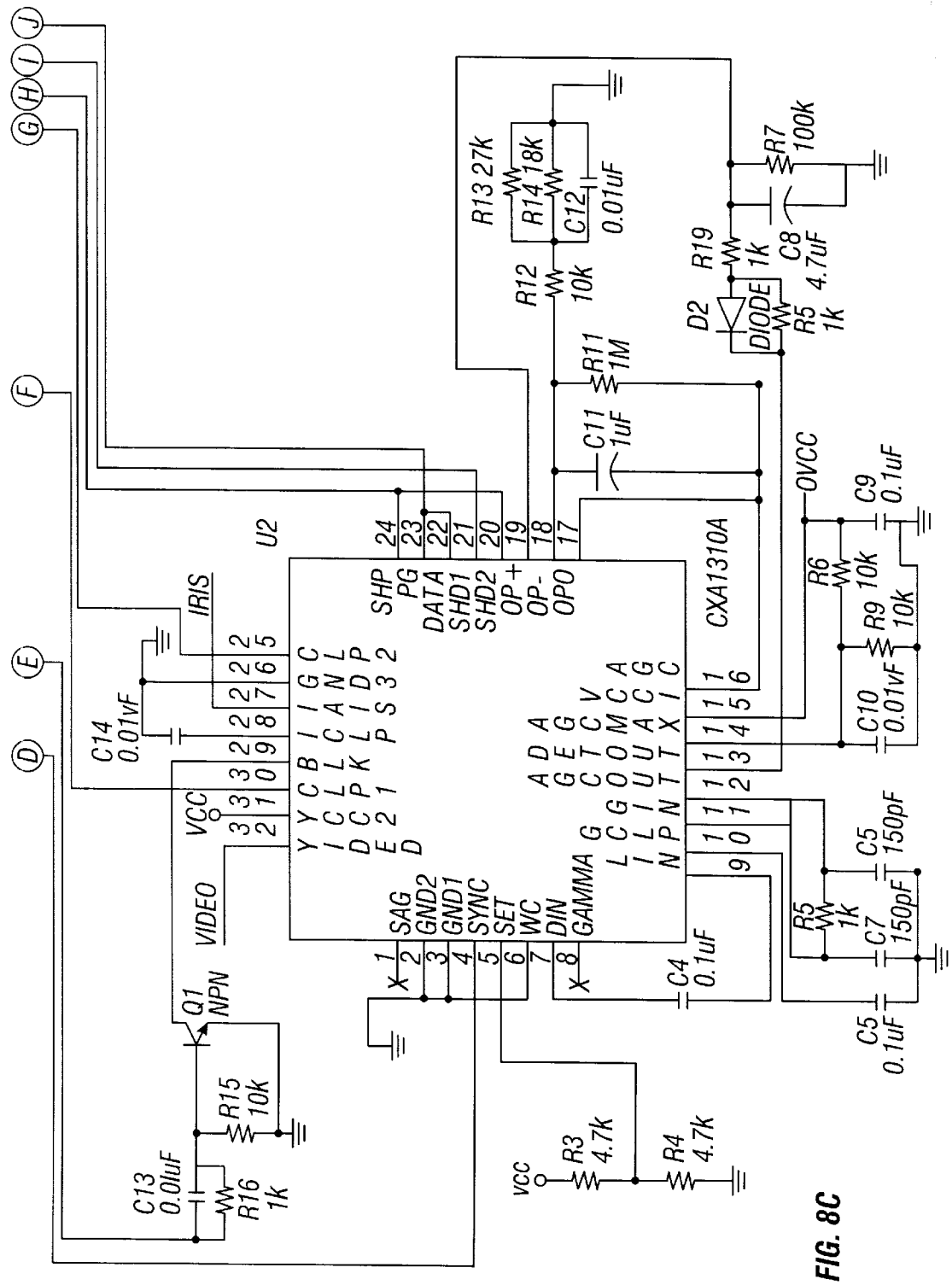
Figure 8D:
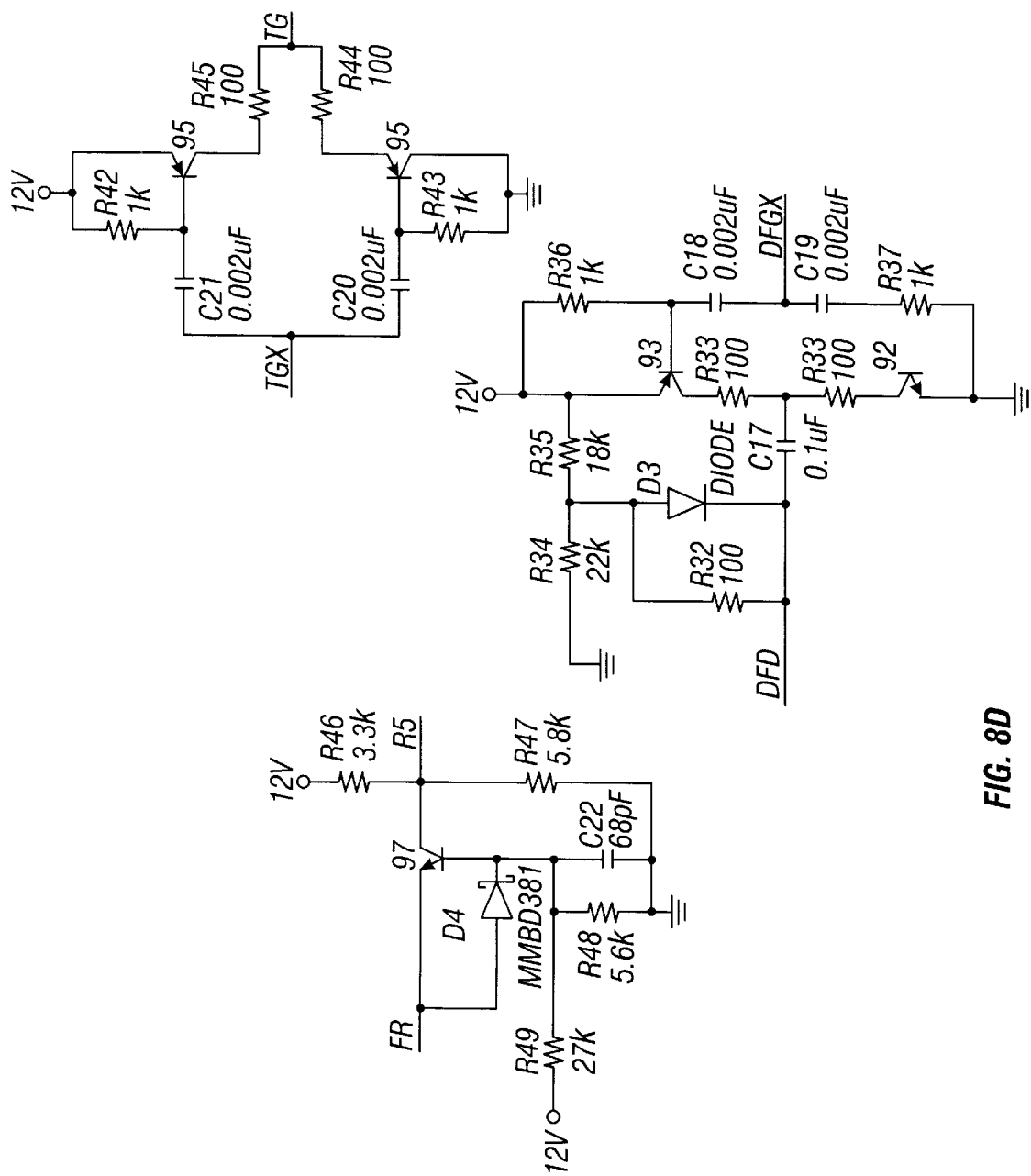

FIG. 8 illustrates one embodiment of a biometric sensor 54 incorporating a CCD camera system which may be implemented within a pointing device, such as within the computer trackball pointing device 10 shown in FIG. 1.

System Embodiments

Figure 9:
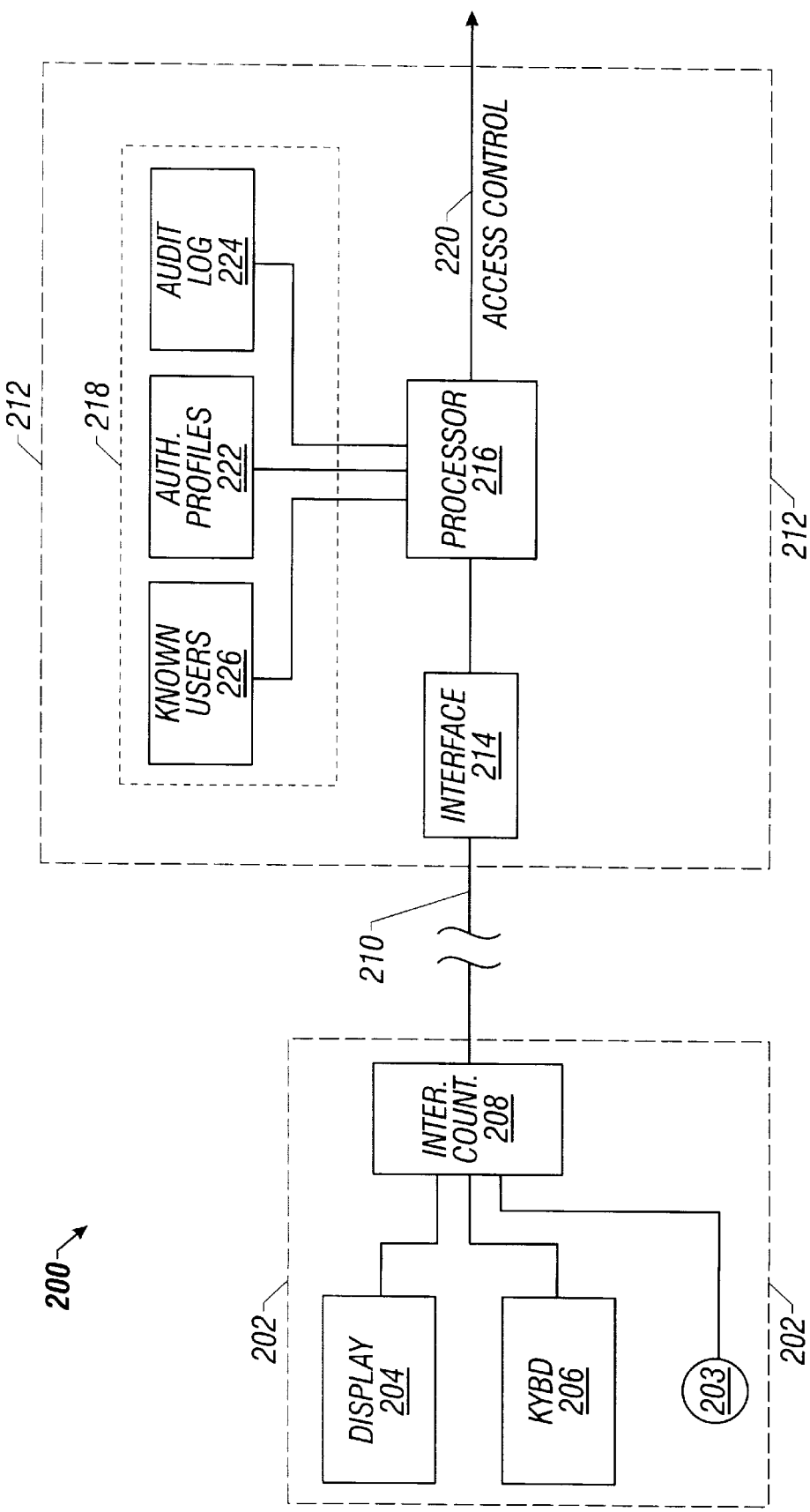
FIG. 9 is a block diagram of a system incorporating the computer pointing device shown in FIG. 1.

FIG. 9 illustrates a system 200 which includes a user interface terminal 202 connected via a connection 210 to a computer verification system 212. User interface terminal 202 includes a biometric input device 203 (e.g., a computer trackball pointing device 10), a keyboard 206, a display 204, and an interface controller 208. The computer verification system 212 includes an interface controller 214, a processor 216, and memory 218. The processor 216 generates an access control signal 220 when user identification and/or authorization has been confirmed and access to a particular system or feature (not shown) is warranted. Such an access-controlled system may reside within the computer verification system 212, or may be external to the computer verification system 212, and may include access to physical equipment or electronically stored or transmitted information.

Memory 218 includes known user storage 226 for storing the identification information, such as a fingerprint "signature," of users already known to the system 212. Memory 218 also includes authorization profile storage 222 for storing authorization information (e.g., permissible dates/times/functions/transactions/machines) for each user already known to the system 212. Memory 218 also includes an audit log storage 224 for storing successful and unsuccessful system accesses, as well as transaction information for users who successfully gain access to the system. The authorization profile storage 222, audit log storage 224, and known user storage 226 may be implemented together as one or more digital memory devices, or may be implemented using separate memory technologies, such as writable CDROM, magnetic disk, optical disk, flash memory, and other well known technologies. Advantageously, one or more of the authorization profile storage 222, the audit log storage 224, and the known user storage 226 may store encoded information, and may be implemented as an electronic memory device connected to the system 212, such as a removable PC card memory device. This affords, for example, an authorized user to carry his profile in a removable device and allows gaining access to any system to which the removable device is connected.

A user initializes the verification system by first using the biometric input device 203, such as the computer trackball pointing device 10, to sense the biometric information (in this example, a fingerprint), to digitize it, optionally compress it or otherwise extract a "signature" representative of that user's fingerprint, and store the information, along with other user identifying information, into the known user storage 226. The stored "signature" is then used to identify and/or verify subsequent attempted accesses of the system 200.

Additionally, information is stored into authorization profile storage 222, preferably by one who controls access to the system, such as a system administrator, a hotel cashier, or others, to specify which user may perform which transactions at what times and dates, etc. Thereafter, when a user attempts to access the system, his or her fingerprint is read by device 203, and compared with the known user storage 226 and the authorization profile storage 222 to determine whether to allow the particular user to perform the function requested. If so, the processor 216 then drives the access control signal 220 and logs the particular transaction, time, date, and identification information for the user. The identification of the user is verified continuously as long as the user is in contact with the biometric input device 203 (for this example, the computer trackball pointing device 10). Each time the user inputs a system request, the verification process must be completed and maintained prior to continuing the use of the device being accessed. Verification times of several seconds are achievable with available processors and algorithms. If the use of the accessed device is discontinued, the verification process must be completed once prior to gaining access to the desired device, and use must be maintained for continued access.

If, at any time, a biometric reading is taken which does not match any user having a profile stored in the known user storage 226, access is denied and an audit log may be stored within the audit log storage 224 to provide a record of unsuccessful access attempts. Such an audit log entry may include time, date, attempted transaction, and a copy of the user identification information determined by the biometric device, such as a scanned fingerprint image, a fingerprint minutia representation, or others. Alternatively, if the user identifying information from the biometric device is matched with a user found in the known user storage 226, but the authorization profile storage 222 indicates that the particular user has requested something for which he or she is not authorized, then access is also denied and an audit log entry is also created in the audit log storage 224. This entry may include time, date, attempted transaction, and an indication of the user's identity, such as a name, a photographic image, or others.

Such an audit log affords a significant capability to detect internal fraud and other unauthorized use by persons known to the system, and indeed authorized to perform some tasks, but not authorized for the task or function at the attempted time or date. For example, assume the system 200 is configured to provide access control to a cash register machine. Assume Sally and Mary are both registered employees known to the system and each has an entry in the known user storage 226. Further assume that Mary is continuously and properly verified during her shift as being authorized to engage in the type of transactions normally performed at her cash register. But if, during one of Mary's short work breaks, Sally tries to access the cash register during a time she is unauthorized, the system logs her unsuccessful attempt along with her name, picture, fingerprint, or some other identifying information. If Sally is unknown to the system altogether (i.e., no entry in the known user storage 226), then the audit log created may include, as well, as much identifying information, such as a fingerprint image, as possible to help law enforcement officials or others in identifying the person responsible for the unsuccessful access.

The computer trackball pointing device 10 may generate a scanned image of a users fingerprint, which is communicated to a host system for verification processing. Alternatively, the verification capability may reside within the computer trackball pointing device 10 along with authorized user keys to allow the pointing device to determine whether a user is authorized, without significant data transfers between the computer trackball pointing device 10 and the attached system. For example, the FingerLoc™ series of devices, available from the Harris Corporation of Melborne, Fla., includes a down-loadable local memory for storing fingerprint profiles for up to 100 users, and includes a processor for independently determining whether an observed fingerprint matches one stored within the local memory, without intervention from an attached host processor. In such an embodiment, the computer trackball pointing device 10 may therefore include biometric identification software, as well.

Combined Identification/Substance Detection Embodiments

In some embodiments of a pointing device employing an optical scanning capability, such as a color CCD imager, it may be possible to determine the blood alcohol content of the user simultaneously with scanning the fingerprint to determine the identification of the user. Such a combined identification/sobriety sensor would only allow access to an authorized person if he/she was sober. This could have tremendously beneficial applications in security access to military bases, power plants, industrial machinery areas, employer liability concerns, and others. A sensitive patch material is commercially available which, when in contact with a person's skin, changes color in response to chemical variations in the user's perspiration, and which is correlated to the person's blood alcohol content. A small patch of such material, if placed over the transparent window, allows a user's finger to be partially visible (and the patch could be sized small enough to preserve enough fingerprint information) for identifying a person, and yet still be large enough to sense perspiration variations, and change color appropriately enough to determine the blood alcohol content of the user. Such an arrangement would make the combined identification/sobriety sensor difficult for two people to fool. If the "authorized" person was drunk, and another person, a "thief," was sober, the system would still be hard to defeat. Such a system may be hard enough to defeat to permit unattended sobriety/identification terminals, for remote access control which ensures a sober user, not just an authorized user. Materials which may be used to detect other substances than alcohol, such as cocaine or other narcotics, may also be available and incorporated advantageously as described above.

Ten Finger Identification With Single Sensor

A pointing device such as a computer trackball pointing device 10 as shown in FIG. 1, or any other device which has only one fingerprint sensor, may be used with up to all ten fingers to decrease the statistical chance of authentication error. For example, a user during the initialization sequence may be requested to place each of his/her fingers on the single fingerprint sensor so the system may learn each of the user's ten fingerprints. Then, periodically or at random, frequent intervals, the user may be requested by the system to place a certain finger on the sensor before the system proceeds. Also, such a system may request all tens fingers be presented sequentially to the sensor after a predetermined period of inactivity. The system may also demand all ten fingers be sequentially placed upon the fingerprint sensor before granting initial access, or after a predetermined period of user inactivity.

Foot-Print Embodiment

Embodiments of the present invention may include adaptations which allow a foot-operated pointing device which identifies a user by matching foot prints. A position sensor may be implemented in a much larger size to be easily operable with one or both feet, while large user-depressable buttons may be engaged with one or more toes, during which time one or more sensors scans portions of the user's foot or feet.

Other Embodiments

It should be appreciated that a mouse position sensor may be used instead of a trackball position sensor by using the teachings of this disclosure.

A fingerprint sensor may also be placed below a transparent trackball to allow reading a user fingerprint through the trackball. Distortions caused by the curvature of the trackball may be accounted for by software transformations of scanned fingerprint image data, or by merely "teaching" the fingerprint of an authorized user by using the same distorted optics.

While the invention has been described with respect to the embodiments set forth above, the invention is not necessarily limited to these embodiments. For example, while recited using a typical context of use with a computer system, a computer pointing device may be attached to a wide variety of other electronic systems which are essentially computer systems or computer-controlled systems, such as set-top boxes for television, security systems, and others. Moreover, a pointing device as described herein is particularly well suited for use with a system along with other biometric sensors, such as a biometric retinal scanner which may be used for identification/authentication and/or substance detection, as well as with a removable PC card memory storage to store biometric information for the authorized user. Accordingly, other embodiments, variations, and improvements not described herein are not necessarily excluded from the scope of the invention, which is defined by the following claims.

What is claimed is:

1. A pointing device comprising:

an interface for operably communicating with a computer system;

a base;

a trackball mounted upon the base;

an upper section having a left and a right side, said upper section moveably connected to the base such that the trackball is positionable adjacent said left or said right side, said upper section including at least one button formed substantially on a top surface of the upper section; and a fingerprint sensor mounted within the upper section and disposed at a location such that when operating said pointing device in a normal manner, a user's hand rest naturally in a position to place a finger of the user's hand in proximity to and readable by said fingerprint sensor.

2. A pointing device as in claim 1 wherein:

the base is substantially circular in shape when viewed from above, thus having a generally circular perimeter; and the trackball is mounted off-center on the base at a location intersecting the generally circular perimeter.

3. A pointing device as in claim 1, wherein the upper section is rotatably-connected to the base.

4. A pointing device as in claim 3 wherein:

when the upper section is rotated such that the trackball is located adjacent the left side, a right-handed user's hand, when operating the device in a normal manner, rests naturally in a position to place a finger of the user's right hand in proximity to and readable by the fingerprint sensor and the user's right thumb in a position to comfortably move the trackball; and when the upper section is rotated such that the trackball is located adjacent the right side, a left-handed user's hand, when operating the device in a normal manner, rests naturally in a position to place a finger of the user's left hand in proximity to and readable by the fingerprint sensor and the user's left thumb in a position to comfortably move the trackball.

5. A pointing device as in claim 1 wherein:

the interface includes a cable passing through a rear surface of the upper section.

6. A pointing device as in claim 1 wherein:

the interface includes a wireless interface having a transducer disposed at a rear surface of the upper section.

7. A pointing device as in claim 1 wherein the upper section comprises:

a plurality of button positions formed substantially on a rearward portion of the top surface of the upper section; and wherein the fingerprint sensor is located beneath a particular one of the button positions.

8. A pointing device as recited in claim 7 wherein:

the fingerprint sensor includes a capacitive imaging array located at the particular button position contactable by the user's finger so that the user's fingerprint may be imaged by the capacitive imaging array.

9. A pointing device as recited in claim 8 wherein:

the fingerprint sensor is incorporated into an operable button located at the particular button position.

10. A pointing device as in claim 7 wherein an operable button of the pointing device is located at the particular button position.

11. A pointing device as in claim 7 wherein no operable button of the pointing device is located at the particular button position.

12. A pointing device as in claim 7 wherein an inoperable button of the pointing device is located at the particular button position.

13. A pointing device as recited in claim 7 wherein:

the fingerprint sensor includes an optical imaging array; and the particular button position includes a transparent material through which the user's fingerprint may be imaged by the imaging array.

14. The pointing device as recited in claim 1, further comprising a verification system for operably communicating with the computer system, the verification system comprising a user storage, an authorization profile storage, and an audit log storage.

15. The pointing device of claim 1, further comprising a substance detection sensor in operative relation with the fingerprint sensor.

16. The pointing device of claim 15, wherein the substance detection sensor detects narcotics, blood alcohol content, or any combination thereof of the user.

17. The pointing device of claim 1, further comprising one or more additional biometric sensors in operative relation with the user and coupled to said interface.

18. A pointing device comprising:

an interface for operably communicating with a computer system;

a base;

a trackball mounted off-center on the base;

an upper section having a left and a right side, said upper section moveably connected to the base such that the trackball is positionable adjacent said left or said right side, said upper section including at least one button formed substantially on a top surface of the upper section;

a fingerprint sensor mounted within the upper section and disposed at a location such that when operating said pointing device in a normal manner a user's hand rests naturally in a position to place a finger of the user's hand in proximity to and readable by said fingerprint sensor; and a verification system for operably communicating with the computer system, the verification system comprising a user storage, an authorization profile storage, and an audit log storage.

19. A pointing device as in claim 18, wherein the upper section is rotatably-connected to the base.

20. A pointing device as in claim 19 wherein:

when the upper section is rotated such that the trackball is located adjacent the left side, a right-handed user's hand, when operating the device in a normal manner, rests naturally in a position to place a finger of the user's right hand in proximity to and readable by the fingerprint sensor and the user's right thumb in a position to comfortably move the trackball; and when the upper section is rotated such that the trackball is located adjacent the right side, a left-handed user's hand, when operating the device in a normal manner, rests naturally in a position to place a finger of the user's left hand in proximity to and readable by the fingerprint sensor and the user's left thumb in a position to comfortably move the trackball.

21. A pointing device as in claim 19 wherein the upper section comprises:

a plurality of button positions formed substantially on a rearward portion of the top surface of the upper section; and wherein the fingerprint sensor is located beneath a particular one of the button positions.

22. A pointing device as in claim 21 wherein:

an operable button of the pointing device is located at the particular button position; and the interface includes a cable passing through a rear surface of the upper section.

23. A pointing device as recited in claim 21 wherein:

the fingerprint sensor includes an optical imaging array; and the particular button position includes a transparent material through which the user's fingerprint may be imaged by the imaging array.

24. A pointing device as recited in claim 21 wherein:

the fingerprint sensor includes a capacitive imaging array located at the particular button position contactable by the user's finger so that the user's fingerprint may be imaged by the capacitive imaging array.

25. A pointing device as recited in claim 24 wherein:

the fingerprint sensor is incorporated into an operable button located at the particular button position.

26. The pointing device of claim 18, further comprising one or more additional biometric sensors in operative relation with the user and coupled to said interface.

27. The pointing device of claim 18, further comprising a substance detection sensor in operative relation with the fingerprint sensor.

28. The pointing device of claim 27, wherein the substance detection sensor detects narcotics, blood alcohol content, or any combination thereof of the user.

* * * * *